(12) United States Patent
Neumeyer et al.

(10) Patent No.: US 9,940,225 B2
(45) Date of Patent: *Apr. 10, 2018

(54) AUTOMATED ERROR CHECKING SYSTEM FOR A SOFTWARE APPLICATION AND METHOD THEREFOR

(71) Applicant: III Holdings 4, LLC, Wilmington, DE (US)

(72) Inventors: Frederick Charles Neumeyer, Austin, TX (US); Gabriel Anthony Aguilar, Round Rock, TX (US); Gregory Allen Bryant, Georgetown, TX (US)

(73) Assignee: III Holdings 4, LLC, Wilmington, DE (US)

( * ) Notice: Subject to any disclaimer, the term of this patent is extended or adjusted under 35 U.S.C. 154(b) by 178 days.

This patent is subject to a terminal disclaimer.

(21) Appl. No.: 15/134,308

(22) Filed: Apr. 20, 2016

(65) Prior Publication Data

US 2016/0306737 A1 Oct. 20, 2016

Related U.S. Application Data

(63) Continuation of application No. 13/708,522, filed on Dec. 7, 2012, now Pat. No. 9,355,017.

(60) Provisional application No. 61/583,926, filed on Jan. 6, 2012.

(51) Int. Cl.
*G06F 9/44* (2006.01)
*G06F 11/36* (2006.01)
*G06F 9/445* (2018.01)

(52) U.S. Cl.
CPC ............ *G06F 11/3688* (2013.01); *G06F 8/61* (2013.01); *G06F 11/368* (2013.01); *G06F 11/3692* (2013.01)

(58) Field of Classification Search
CPC ........... G06F 2201/865; G06F 11/3612; G06F 11/368; G06F 11/3688
See application file for complete search history.

(56) References Cited

U.S. PATENT DOCUMENTS

| | | |
|---|---|---|
| 4,947,432 A | 8/1990 | Topholm |
| 4,972,487 A | 11/1990 | Mangold et al. |
| 5,721,783 A | 2/1998 | Anderson |

(Continued)

FOREIGN PATENT DOCUMENTS

| | | |
|---|---|---|
| WO | 2008071236 A2 | 6/2008 |
| WO | 2009001559 A1 | 12/2008 |

OTHER PUBLICATIONS

Christain Murphy et al., Backstop: A Tool for Debugging Runtime Errors, 2008, ACM, retrieved on Dec. 10, 2001, pp. 173-177. Retrieved from the Internet: <URL: http://delivery.acm.org/10.1145/1360000/1352193/p173-murphy.pdf?>.*

(Continued)

*Primary Examiner* — Hanh T Bui
(74) *Attorney, Agent, or Firm* — Perkins Coie LLP

(57) ABSTRACT

A test system for providing automatic testing of an application on a plurality of devices, the system including an input/output device for communicating with the plurality of devices, a processor and a memory that stores instructions which cause the processor to install an application on a device, monitor the device as it performs a series of steps, and record the results of the series of steps in a log.

14 Claims, 5 Drawing Sheets

(56) References Cited

U.S. PATENT DOCUMENTS

| | | |
|---|---|---|
| 6,381,604 B1 | 4/2002 | Caughran et al. |
| 6,741,712 B2 | 5/2004 | Bisgaard et al. |
| 7,080,357 B2 | 7/2006 | Foster et al. |
| 7,334,162 B1 | 2/2008 | Vakrat et al. |
| 7,480,907 B1 | 1/2009 | Marolia et al. |
| 7,519,194 B2 | 4/2009 | Niederdränk et al. |
| 7,594,220 B2 | 9/2009 | Kodosky et al. |
| 7,630,708 B2 | 12/2009 | So et al. |
| 7,712,083 B2 | 5/2010 | Coppert et al. |
| 7,735,065 B2 | 6/2010 | Jain et al. |
| 7,933,419 B2 | 4/2011 | Roeck et al. |
| 8,141,043 B2 | 3/2012 | Jones et al. |
| 8,359,580 B2 | 1/2013 | Gonzales et al. |
| 8,379,871 B2 | 2/2013 | Michael et al. |
| 8,413,118 B2 | 4/2013 | Kodosky et al. |
| 8,457,335 B2 | 6/2013 | Imamura et al. |
| 8,516,446 B2 | 8/2013 | Williams et al. |
| 8,526,649 B2 | 9/2013 | Foo et al. |
| 8,566,648 B2 | 10/2013 | Schroeder et al. |
| 8,578,338 B2 | 11/2013 | Nguyen et al. |
| 8,611,570 B2 | 12/2013 | Neumeyer et al. |
| 8,620,305 B2 | 12/2013 | Singh et al. |
| 8,621,434 B2 | 12/2013 | Campion et al. |
| 8,649,538 B2 | 2/2014 | Apfel et al. |
| 8,654,999 B2 | 2/2014 | Mindlin et al. |
| 8,661,411 B2 | 2/2014 | Agapi et al. |
| 8,683,462 B2 | 3/2014 | Goldman et al. |
| 8,739,125 B2 | 5/2014 | Petrovický et al. |
| 8,761,421 B2 | 6/2014 | Apfel et al. |
| 8,787,603 B2 | 7/2014 | Fichtl et al. |
| 8,810,392 B1 | 8/2014 | Teller et al. |
| 8,826,240 B1 | 9/2014 | Lachwani et al. |
| 9,032,371 B2* | 5/2015 | Hansson ............. G06F 11/3692 714/38.1 |
| 9,191,756 B2 | 11/2015 | Neumeyer et al. |
| 9,355,017 B2 | 5/2016 | Neumeyer et al. |
| 2002/0143997 A1 | 10/2002 | Huang et al. |
| 2003/0008659 A1 | 1/2003 | Waters et al. |
| 2003/0009740 A1 | 1/2003 | Lan |
| 2003/0037316 A1 | 2/2003 | Kodosky et al. |
| 2003/0059076 A1 | 3/2003 | Martin et al. |
| 2003/0131285 A1 | 7/2003 | Beardsley et al. |
| 2003/0215105 A1 | 11/2003 | Sacha et al. |
| 2004/0059446 A1 | 3/2004 | Goldberg et al. |
| 2005/0036637 A1 | 2/2005 | Janssen et al. |
| 2006/0037002 A1 | 2/2006 | Vinberg et al. |
| 2006/0182294 A1 | 8/2006 | Grasbon et al. |
| 2006/0271915 A1 | 11/2006 | Stefik et al. |
| 2007/0064018 A1 | 3/2007 | Shoemaker et al. |
| 2007/0089091 A1 | 4/2007 | Larab et al. |
| 2007/0098195 A1 | 5/2007 | Holmes et al. |
| 2007/0234293 A1 | 10/2007 | Noller et al. |
| 2007/0255435 A1 | 11/2007 | Cohen et al. |
| 2008/0052138 A1 | 2/2008 | Marsh et al. |
| 2008/0066080 A1 | 3/2008 | Campbell |
| 2008/0127101 A1 | 5/2008 | Anafi et al. |
| 2008/0244532 A1 | 10/2008 | Arcese et al. |
| 2008/0288923 A1* | 11/2008 | Shimogori ............. G06F 11/323 717/125 |
| 2009/0328028 A1 | 12/2009 | O'Rourke et al. |
| 2010/0027822 A1 | 2/2010 | Dietz et al. |
| 2010/0146489 A1 | 6/2010 | Ortiz et al. |
| 2010/0255782 A1 | 10/2010 | Klemmensen et al. |
| 2010/0273452 A1 | 10/2010 | Rajann et al. |
| 2010/0299654 A1 | 11/2010 | Vaswani et al. |
| 2011/0029957 A1 | 2/2011 | Shufer et al. |
| 2011/0055815 A1* | 3/2011 | Squillace ............. G06F 11/3612 717/125 |
| 2011/0185231 A1 | 7/2011 | Balestrieri et al. |
| 2011/0231936 A1* | 9/2011 | Williams ............. G06F 21/577 726/25 |
| 2012/0233235 A1 | 9/2012 | Allaire et al. |
| 2012/0266157 A1 | 10/2012 | Mun et al. |
| 2012/0317548 A1 | 12/2012 | Olsa et al. |
| 2013/0179858 A1 | 7/2013 | Mecke et al. |
| 2015/0058826 A1 | 2/2015 | Hu et al. |

OTHER PUBLICATIONS

"Good Practice Guidance for Adult Hearing Aid Fitting and Services," prepared for International Society of Audiology, Nov. 2004, 8 pages. Exhibit 1012, Case IPR2017-00781.

American Heritage Dictionary of the English Language, 5th edition, 2011, p. 1652. Exhibit 1011, Case IPR2017-00783.

Aug. 16, 2013 Response to Jun. 4, 2013 Office Action in Prosecution History of U.S. Pat. No. 8,611,570, 9 pages. Exhibit 1004, Case IPR2017-00367.

Barron's Dictionary of Computer and Internet Terms, 11th edition, 2013, p. 457. Exhibit 1012, Case IPR2017-00783.

Certified English language translation of German Patent Publication No. DE19542961, May 15, 1997, 16 pages. Exhibit 1009, Case IPR2017-00781.

Certified English language translation of WIPO Patent Publication No. WO2009/001559 to Imamura et al., Dec. 31, 2008, 79 pages. Exhibit 1006, Case IPR2017-00367.

Consumer Reports, "Hear Well in a Noisy World—features at a glance," Jul. 2009, 2 pages. Exhibit 1009, Case IPR2017-00414.

Declaration of Dr. Les Atlas, Exhibit 1008, Case IPR2017-00781 Jan. 26, 2017 145 pages.

Declaration of Dr. Robert E. Morley, Jr., Exhibit 1002, Case IPR2017-00496. Dec. 21, 2016, 87 pages.

Declaration of Dr. Robert K. Morrow, Exhibit 1003, Case IPR2017-00783. Jan. 27, 2017, 85 pages. Exhibit 1003, Case IPR2017-00783.

Declaration of Dr. Sayfe Kiaei, Exhibit 1002, Case IPR2017-00367 Dec. 4, 2016, 102 pages.

Declaration of Les Atlas PhD, Exhibit 1003, Case IPR2017-00414. Dec. 6, 2016, 111 pages.

Dillon et al., "The trainable hearing aid: What will it do for clients and clinicians?" The Hearing Journal, vol. 59, No. 4, Apr. 2006, 6 pages. Exhibit 1014, Case IPR2017-00781.

Jul. 10, 2013 Response to May 30, 2013 Office Action in Prosecution History of U.S. Pat. No. 8,761,421, 13 pages. Exhibit 1008, Case IPR2017-00496.

Kasoff, B., "A Closer Look: The Evolution of the Smart Phone," Sep. 19, 2014, 2 pages. <blog.wipp.org/2014/09/a-closer-look-the-evolution-of/> Exhibit 1016, Case IPR2017-00783.

Keidser, Gitte et al., "Variation in preferred gain with experience for hearing-aid users," 2008, International Journal of Audiology 47:10, 621-635. Exhibit 1013, Case IPR2017-00781.

Mar. 1, 2013 Response to Dec. 12, 2012 Office Action in Prosecution History of U.S. Pat. No. 8,761,421, 22 pages. Exhibit 1006, Case IPR2017-00496.

Martin, T., "The evolution of the smartphone," Jul. 29, 2014, 20 pages. <pocketnow.com/2014/07/28/the-evolution-of-the-smartphone> Exhibit 1014, Case IPR2017-00783.

Mukherjee, S., "Smartphone Evolution: From IBM Simon to Samsung Galaxy S3," May 8, 2012, p. 3. <ibtimes.com/smartphone-evolution-ibm-simon-samsung-galaxy-s3-697340> Exhibit 1015, Case IPR2017-00783.

Prosecution History of U.S. Pat. No. 8,649,538 to Apfel et al., 166 pages; patent application filed Feb. 8, 2011. Exhibit 1002, Case IPR2017-00414.

Prosecution History of U.S. Pat. No. 8,654,999 to Mindlin et al., 194 pages; patent application filed Apr. 12, 2011. Exhibit 1002, Case IPR2017-00781.

Prosecution History of U.S. Pat. No. 9,191,756 to Neumeyer et al., 71 pages; patent application filed Dec. 7, 2012. Exhibit 1002, Case IPR2017-00783.

Rodriguez, Gary P. et al. "Preferred Hearing Aid Response Characteristics Under Acoustic and Telecoil Coupling Conditions," American Journal of Audiology55, Nov. 1993, 5 pages. Exhibit 1011, Case IPR2017-00414.

Sager, I., "Before IPhone and Android Came Simon, the First Smartphone," Jun. 29, 2012, 3 pages. <bloomberg.com/news/ar-

(56) References Cited

OTHER PUBLICATIONS ticles/2012-06-29/before-iphone-and-android-came-simon-the-first-smartphone> Exhibit 1013, Case IPR2017-00783.
United States Patent and Trademark Office, dated Dec. 12, 2012 Office Action from Prosecution History of U.S. Pat. No. 8,761,421, 19 pages. Exhibit 1003, Case IPR2017-00496.
United States Patent and Trademark Office, dated Jun. 4, 2013 Office Action from Prosecution History of U.S. Pat. No. 8,611,570, 6 pages. Exhibit 1003, Case IPR2017-00367.
United States Patent and Trademark Office, dated May 30, 2013 Office Action from Prosecution History of U.S. Pat. No. 8,761,421, 19 pages. Exhibit 1007, Case IPR2017-00496.
United States Patent and Trademark Office, Patent Trial and Appeal Board, *K/S HIMPP* v. *III Holdings 4, LLC*, Case IPR2017-00367 (U.S. Pat. No. 8,611,570), Petition for Inter Partes Review, dated Dec. 6, 2016, 81 pages.
United States Patent and Trademark Office, Patent Trial and Appeal Board, *K/S HIMPP* v. *III Holdings 4, LLC*, Case IPR2017-00414 (U.S. Pat. No. 8,649,538), Petition for Inter Partes Review, dated Dec. 6, 2016, 84 pages.
United States Patent and Trademark Office, Patent Trial and Appeal Board, *K/S HIMPP* v. *III Holdings 4, LLC*, Case IPR2017-00496 (U.S. Pat. No. 8,761,421), Petition for Inter Partes Review, dated Dec. 21, 2016, 91 pages.
United States Patent and Trademark Office, Patent Trial and Appeal Board, *K/S HIMPP* v. *III Holdings 4, LLC*, Case IPR2017-00781 (U.S. Pat. No. 8,654,999), Petition for Inter Partes Review of claims 1-9 and 16-19, dated Jan. 27, 2017, 69 pages.
United States Patent and Trademark Office, Patent Trial and Appeal Board, *K/S HIMPP* v. *III Holdings 4, LLC*, Case IPR2017-00782 (U.S. Pat. No. 8,654,999), Petition for Inter Partes Review of claims 10-15 and 20, dated Jan. 27, 2017, 56 pages.
United States Patent and Trademark Office, Patent Trial and Appeal Board, *K/S HIMPP* v. *III Holdings 4, LLC*, Case IPR2017-00783 (U.S. Pat. No. 9,191,756), Petition for Inter Partes Review, dated Jan. 27, 2017, 79 pages.
Valente, Michael, "Guideline for Audiologic Management of the Adult Patient," Audiology Online 2016, Oct. 30, 2006, 8 pages. Exhibit 1011, Case IPR2017-00781.
Widrow, Bernard et al. "Microphone Arrays for Hearing Aids: An Overview," Journal of Speech Communication, Jan. 2003, pp. 139-146. Exhibit 1010, Case IPR2017-00414.
Bhattacharya, et al., "An Empirical Analysis of Bug Reports and Bug Fixing in Open Source android Apps"; 2013 IEEE; [retrieved on Jan. 13, 2016]; Retrieved from Internet <URL: http://ieeexplore.ieee.org/stamp/stamp.jsp?tp=&arnumber=6498462>; pp. 113-143.
Choudhary, et al., "WEBDIFF: Automated Identification of Cross-browser Issues in Web Applications"; 2010 IEEEE; [retrieved on Jan. 13, 2016]; Retrieved from Internet <URL: http://ieeexplore.ieee.org/stamp/stamp.jsp?tp=&arnumber=5609723>; pp. 1-10.
Liu, Han, "Failure Proximity: A Fault Localization-Based Approach"; 2006 ACM; [retrieved on Jan. 13, 2016]; Retrieved from Internet <URL: http://dl.acm.org/citation.cfm?id=1181782&CFID=575059846&CFTOKEN=30592802>; pp. 46-56.
Runeson, et al., "Detection of Duplicate Defect Reports Using Natural Language Processing"; 2007 ACM; [retrieved on Jan. 13, 2016]; Retrieved from Internet <URL: http://dl.acm/org/citation.cfm?id= 1248882&CFI D=575059846&CFTOKEN=30592802>; p. 1-10.

* cited by examiner

AUTOMATED ERROR CHECKING SYSTEM FOR A SOFTWARE APPLICATION AND METHOD THEREFOR

CROSS-REFERENCE TO RELATED APPLICATION(S)

This application is a continuation of U.S. application Ser. No. 13/708,522, filed Dec. 7, 2012 (now U.S. Pat. No. 9,355,017), which is a non-provisional of and claims priority to Provisional Application No. 61/583,926 filed on Jan. 6, 2012 and entitled "AUTOMATED ERROR CHECKING SYSTEM FOR A SOFTWARE APPLICATION," which are incorporated herein by reference in their entireties.

FIELD

This disclosure relates generally to system and method of automating error checking for a software application, and more particularly for a software application configured to operate on a portable computing system, such as a smart phone.

BACKGROUND

Application development has become a major industry worldwide. The industry has grown as the demand for portable phones, has increased. Today, more and more applications are being written at a faster and faster pace as developers try to fill the demand.

One major cost to application developers includes costs associated with staffing of sufficient programmers to provide adequate error and bug checking. Further, when testing code executing on phones, an additional cost includes the cost of purchasing sufficient variety of phone models to ensure Mot free code for most end users. This is a particular problem for developers because of the great plurality of phones and operating system versions that have been released. Designing an application to run on all platforms requires significant error checking. Releasing an application with too many errors often can be disastrous for company. In response to the needs of the developers, many companies offer manual error and bug testing services for application developer companies. These companies hire programmers to apply series of test protocols in order to discover errors or bugs in the application and to report a bug to the developers. While the error testing firms are able to reduce the staffing costs of the application developers, such companies typically charge hourly rates for software testing, so the costs associated with error testing remain high.

BRIEF DESCRIPTION OF THE DRAWINGS

In the following description, the use of the same reference numerals in different drawings indicates similar or identical items.

DETAILED DESCRIPTION OF ILLUSTRATIVE EMBODIMENTS

Embodiments of systems and methods are disclosed below that provide an automated and/or remote error testing for application software intended for a plurality of devices and operating systems. The system is configured such that the application may be added or uploaded to an application source. A test system is able to access the application, install the application on to one or more devices, provide a data stream including at least one command to the application, and record test and error records as the application executes the data stream. The test system is configured to install the application on the one or more devices and execute new sequences of random commands. Each time an error occurs; the test system logs the error and attempts to reproduce the error under the same conditions, before trying to reproduce the error on other types of devices and operating systems connected to the test system. An example of a software application testing system is described below with respect to FIG. 1.

Figure 1:
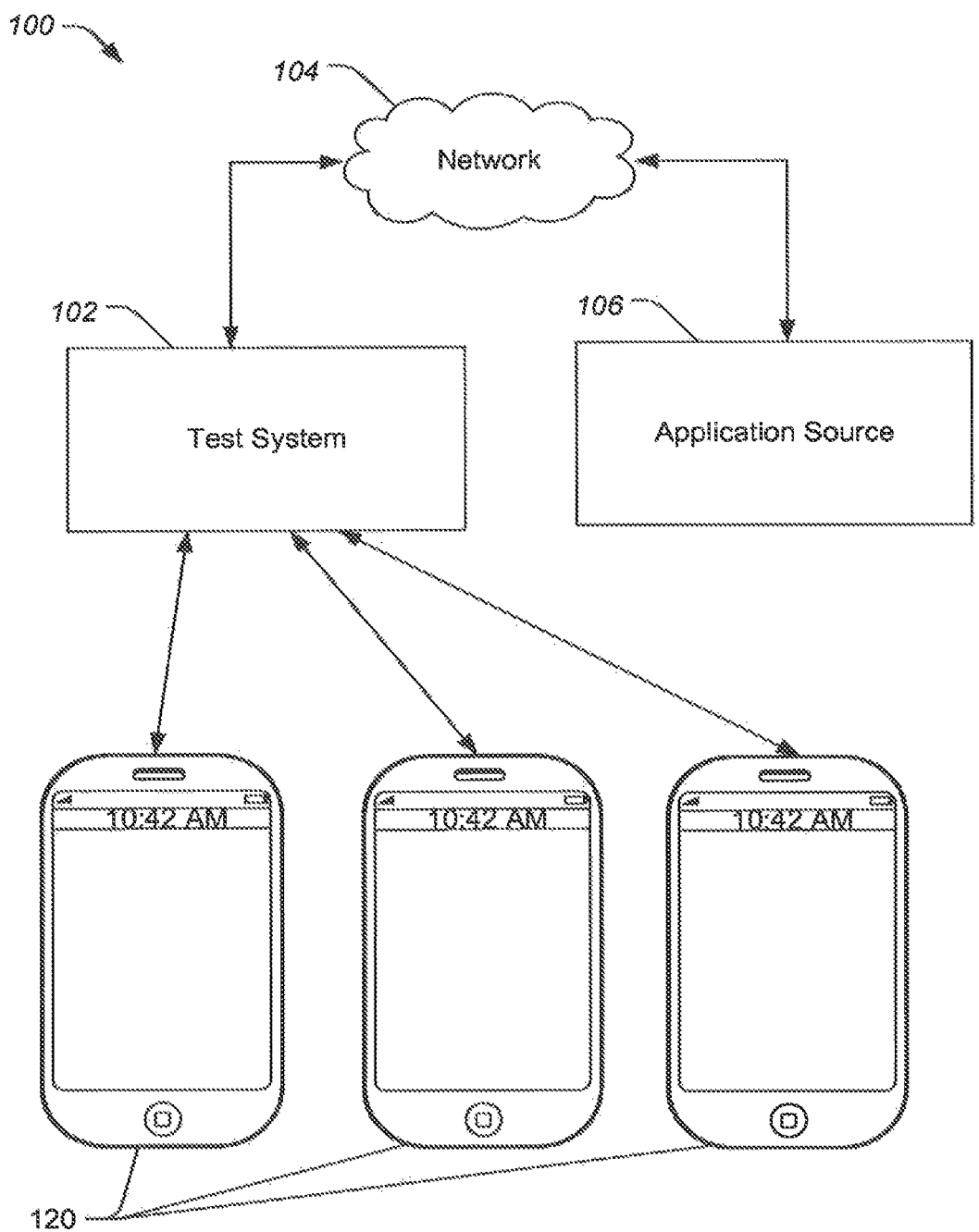
FIG. 1 is a diagram of a system including a testing system for providing automated error testing of an application executable on a plurality of devices.

FIG. 1 is a pictorial view of a system 100 for providing automated error testing of an application on a plurality of devices 120. System 100 includes a test system 102 configured to communicate with an application source 106, possibly through network 104 (such as the Internet), and with the plurality of portable devices 120 through an input/output interface such as a universal serial bus (USB) interface or a wireless transceiver. The plurality of portable devices 120 are portable personal computing devices such as a smart phone or tablets.

Application source 106 may be a database, a code repository system (such as the Kiln® or FogBugz® systems commercially available through www.fogcreek.com), a user interface, a website, or other system for receiving and storing applications. Application source 106 may include code versioning or other application tracking features.

In one example, the application source 106 may be a memory in test system 102. In one embodiment, test system 102 accesses application source 106 to see if any applications have been uploaded, or if any changes to existing applications have been uploaded for error testing. If test system 102 finds an application ready for testing in application source 106 it downloads the application through network 104. Test system 102 selects one of the portable devices 120 and clears the memory before installing the application on the portable device 120. Test system 102 may select the portable device 120 based on a random selection algorithm, by checking the availability of the plurality of the portable devices, or by selecting a portable device on which the application has not previously been tested.

Once the application has been installed, test system 102 generates a random data stream including at least one command, and provides the data stream to the application. While the application executes the command, test system 102 monitors the execution of the application and the state of the portable device to generate a test record. The test record may include the data stream, the device make and manufacture, the operating system name and version, the start and end state of the portable device, any error including error messages, and the results produced by the application after processing the data stream. Test system 102 then stores the test record in a log which is made available to the user directly through the test system 102, the application source 106, or email.

In an embodiment, test system 102 is a client system and application source 106 is a web interface or website accessible by a user for the uploading, testing, versioning, and tracking of software application code. Application source 106 is configured to provide the applications uploaded by a user to test system 102 which preforms the error testing. In this way system 100 is able to provide a software application testing service over the internet or other networks. In another embodiment, test system 102 may be an executable file that may be run to install the test system program on a user computer. In this embodiment, application source 106 may a memory location on the user computer or provided as a remote database which the test system program is able to access through a network. Thus, test system 102 may be sold as software program or a software program bundled with code versioning and backup services.

Figure 2:
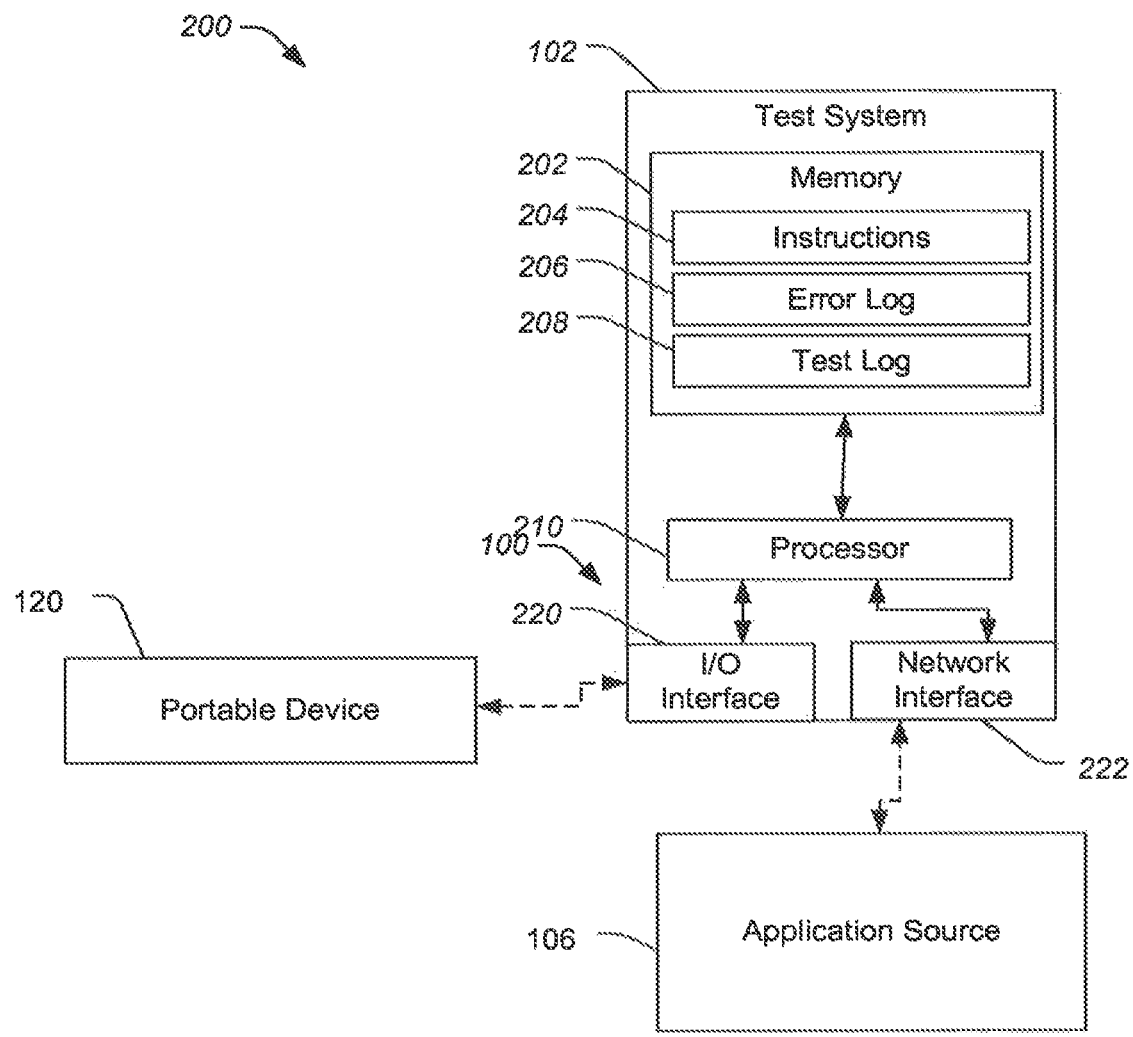
FIG. 2 is a block diagram of an embodiment of the system of FIG. 1.

FIG. 1 shows a representative example of one possible embodiment of an automated error checking system. FIG. 2 shows a more detailed block diagram of the system of FIG. 1.

FIG. 2 is a block diagram of an embodiment 200 of system 100 of FIG. 1. In the illustrated example, test system 102 includes a processor 210 and a memory 202 coupled to processor 210 and configured to store instructions 204, at least one error log 206, and at least one test log 208. Test system 102 also includes an input/output interface 220 configured to communicate with a plurality of portable devices 120 and a network interface 222 which is configured to communicate with an application source 106.

Error log 206 includes error records generated by test system 102 while running an application on at least one of the plurality of portable devices 120. Test log 208 includes test records that resulted from running a series data streams on the plurality of portable devices. It should be understood that error log 206 and test log 208 may be a single combined log.

Instructions 204, when executed by processor 210, and cause processor 210 to fetch an application from application source 106, select one of portable device 120 coupled to input/output interface 220, and install the application on the selected portable device. Instructions 204 further cause processor 210 to initiate execution of the application on the selected portable device 120, generate a random data stream including at least one command, and provide the data stream to the selected portable device through the input/output interface 220. In-addition to the at least one command, the data stream may also include additional commands, instructions, random data, and/or memory addresses. In one example, the data stream is generated randomly. In another example, the data stream is predetermined by a user.

Instructions 204 further cause processor 210 to monitor the execution of the application as it processes the data stream. Instructions 204 also cause processor 210 to generate a test record including the device make and manufacture information, operating system information including version, start and end state of portable device 120, any error with messages that may have occurred, and the results. Processor 210 then stores the test record as an entry in test log 208. If an error occurred, instructions 204 further cause processor 210 to generate an error record including the data stream, the error, and the make, model, and operating system version and store such data in error log 206 in addition to recording the test record in test log 208.

In one embodiment, after the error record is entered in error log 206, instructions 204 cause processor 210 to uninstall the application from the selected portable device 120 returning to a clean state. Thus, processor 210 re-installs the application and provides the application the same data stream that caused the error. If the error occurs once again, then processor 210 marks the error as repeatable in the error record. By placing the portable device 120 into a clean state before running every test, test system 102 is able to ensure that the every error detected is actually caused by the application responding to the data stream and not because of the effects of previous test. It should be understood, that test system 102 when returning the portable device 120 to a clean state may return the device all the way back to the manufacturing settings. It should also be understood, that test system 102 may place portable device 120 in a clean state between tests even if an error did not occur.

If the error does not occur once again, than test system 102 may do several things. In one example, processor 210 uninstall the application from the selected portable device 120 returning to a clean state, installs the application, launches the application, provides the application the data stream, and monitors the application. This provides verification that there were no anomalies in during the second attempt. In another example, processor 210 may run the test on another of the portable devices 120 identical to the selected portable device 120 to confirm that there is not a hardware issue.

In another embodiment, after the error record is entered in error log 206, instructions 204 cause processor 210 to select a second portable device 120 of different make, manufacture, or operating system version than the previously selected portable device 120. Processor 210 then clears the memory of the second device, installs the application, and provides the application the same data stream that caused the error. If the error occurs again on the second device then processor 210 marks the error as repeatable and the additional make, model, or operating system version of the second device in the error record.

Figure 3:
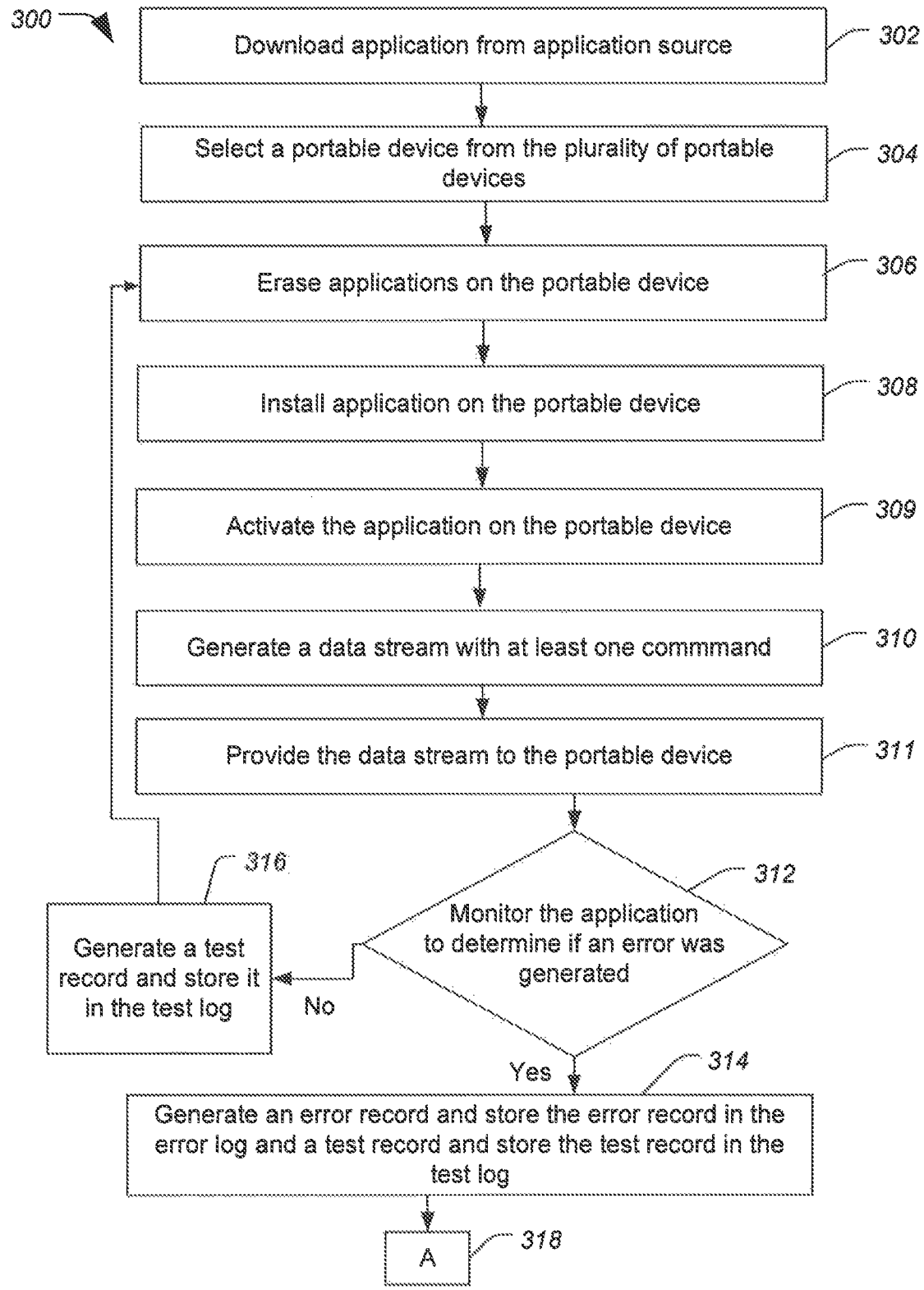
FIG. 3 is a flow diagram of an embodiment of a method of providing automated error testing for an application on a portable device.

FIG. 2 shows a block diagram of system 100 of FIG. 1, while FIG. 3 shows a flow diagram of the instructions executed by processor 210 when preforming the error testing.

FIG. 3 is a flow diagram of an embodiment of a method 300 of providing automated error testing for an application on a portable device, such as the plurality of portable devices 120 of FIGS. 1 and 2. At 302, test system 102 downloads an application from an application source, proceeds to 302 where test system 102 prepares an error test with random data steam. At 304, test system 102 selects a portable device from a plurality of portable devices. Proceeding to 306, test system 102 erases all applications on the selected portable device. Continuing to 308, test system 102 installs the downloaded application on the selected portable device and advances to 309. At 309, test system 102 activates the installed application on the portable device. Proceeding to 310, test system 102 generates a ransom data stream including at least one command and advances to 211 where test system 12 provides the data stream to the selected portable device. Advancing to 312, test system 102 monitors the application to determine if an error was generated, if not advances to 316 generates a test record and stores it in test log 208 and method 300 returns to 301. If an error was generated method 300 proceeds to 314 and generates an error record which it stores in error log 206 and a test record which it stores in test log 208.

Figure 4:
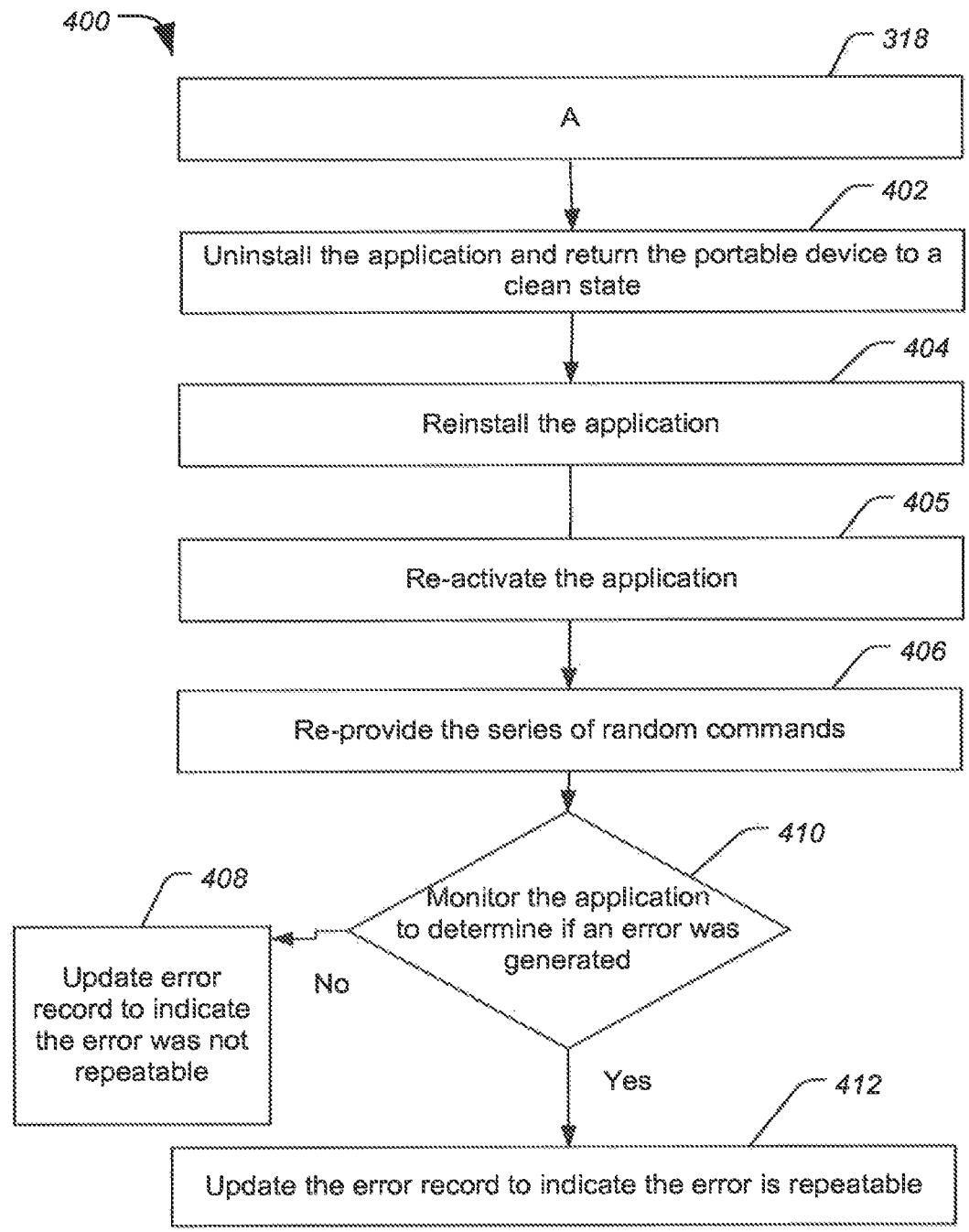
FIG. 4 is a flow diagram of an embodiment of a method of providing automated error repeatability confirmation for an application on a portable device.
Figure 5:
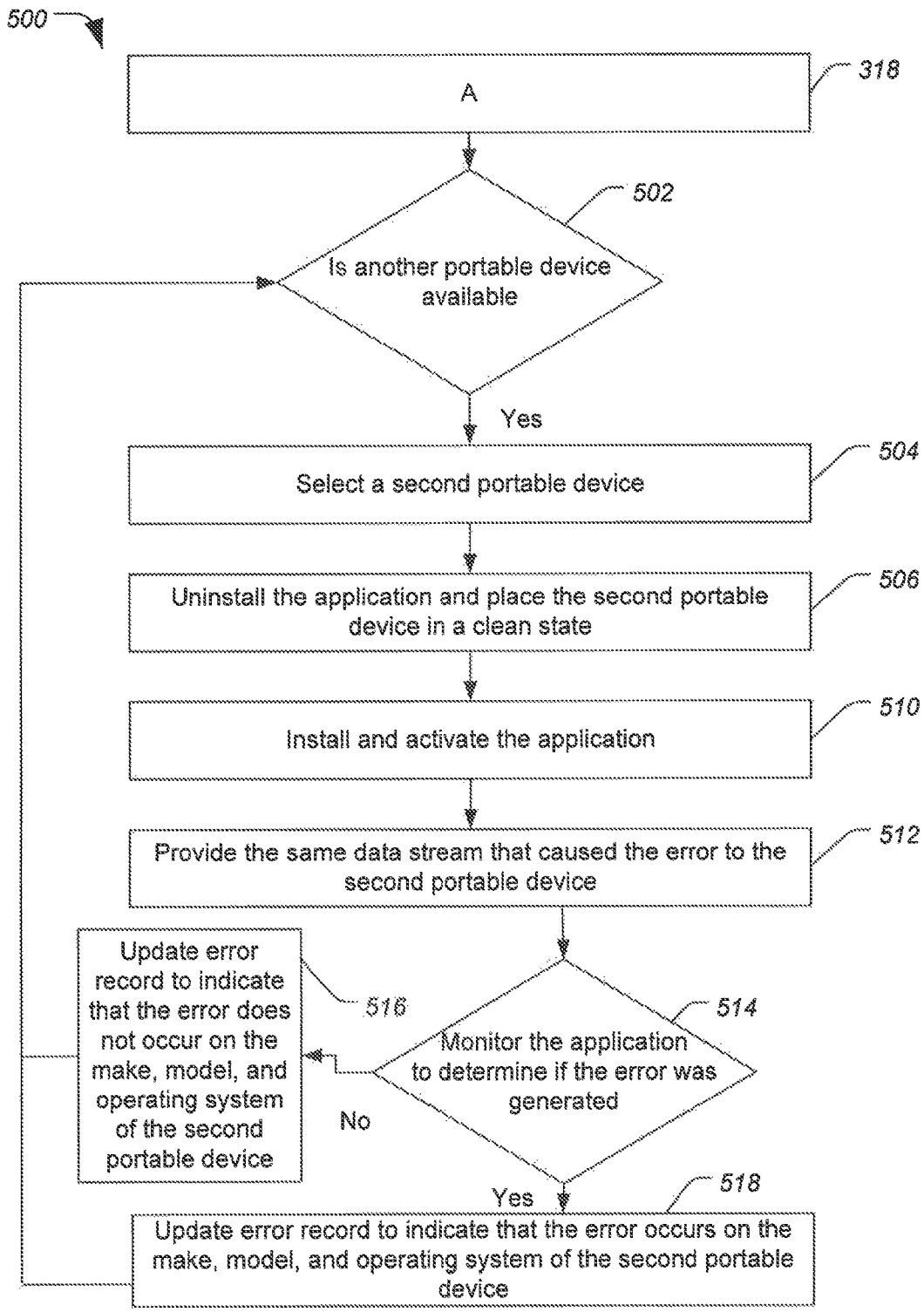
FIG. 5 is a flow diagram of an embodiment of a method of providing automated error testing for an application on a plurality of portable devices.

After the error record is recorded in error log 206 proceeds to 318 and method 300 of FIG. 3 ends. FIGS. 4 and 5 show a flow diagram of test system 102 conducting continued error testing starting at 318.

FIG. 4 is a flow diagram of an embodiment of a method 400 of providing automated error confirmation for an application on a portable device. Starting at 318, method 400 proceeds 402 and test system 102 uninstalls the application from the selected portable device and returns the device to a clean state. By returning the device to a clean state test system 102 is able to ensure that the error detected in method 300 is not affecting method 400. Advancing to 404, test system 102 re-installs the application on the selected portable device and advances to 505 where test system 102 re-activates the application. Proceeding to 406, and re-provides the data stream that caused the error to the application. Proceeding to 410, test system 102 monitors the application to determine if the error reoccurs, if it does not method 300 proceeds to 408 updates the error record to indicate the error was not repeatable and method 400 ends. Test system 102 at this time may begin a new error test by returning to 302 of FIG. 3 or preform a triple check on the error by returning to 402 and rerunning method 400. If, however, an error does occur method 400 proceeds to 412 and the error record is updated to indicate the error is repeatable and method 400 ends. Again as explained above when method 400 ends, test system 102 may begin a new error test by returning of 302 of FIG. 3.

FIG. 4 is a flow diagram of method 400 which proceeds from 318 and provides additional blocks to confirm an error is repeatable using the selected portable device, while FIG. 5 is a flow diagram also proceeding form 316 which provides additional blocks for checking for the error detected at 312 is reproducible on other portable devices, other operating system versions, and/or other operating systems.

FIG. 5 is a flow diagram of an embodiment of a method 500 of providing automated error testing for an application on a plurality of portable devices. Starting at 318, method 500 proceeds to 502 and test system 102 checks to determine if another portable device is available for testing the application. If not method 500 ends. Test system 102 at this time may begin a new error test by returning to 302 of FIG. 3. However, if another portable device is available method 500 advances to 504. Test system 102 may determine that a portable device is available for example by determining if another device is connected, if a device with another make, model, or operating system version is connected, or by determining if any devices connected are not in use, or various other known methods.

At 504, test system 102 selects one of the available portable devices as a second test device and proceeds to 506 where test system 102 clears memory and returns the second test device to a clean state. Advancing to 510, test system 102 installs and activates the application on the second test device and proceeds to 512 where test system 102 provides the same data stream that caused the error to the second test device. Advancing to 514, test system 102 monitors the second. test device to determine if the error re-occurs on the second test device. If the error does not occur, method 500 proceeds to 516 and test system 102 modifies the error record to indicate that the error does not occur on the make, model, and operating system of the second test device and method 500 returns to 302. However, if the error does occur, test system 102 modifies the error record to indicate that the error reoccurred on the make, model, and operating system of the second test device. Test system 102 may also include any differences that occurred in the state, error message, or result between the selected portable device and the second test device. After modifying the error record, method 500 returns to 502.

It should be understood that in one particular embodiment of method 300, method 300 in combination with method 400, or method 300 in combination with method 500 may be implemented as a continuous loop, such that at 318, 412 or 502 the methods may return to 302 and begin another test. In this embodiment, the method may be ended when a threshold number of errors have occurred, test system 102 has lost connection with all of the portable devices, a timer expires, or a user enters a command to end the testing.

Although the present invention has been described with reference to preferred embodiments, workers skilled in the art will recognize that changes may be made in form and detail without departing from the scope of the invention.

What is claimed is:

1. A computer-implemented method, comprising:
   fetching an application from an application source, wherein the application is in a debugging phase;
   installing the application on a portable device;
   providing a first datastream including a first command to the portable device; monitoring execution of the first command by the application on the portable device;
   generating a test record associated with the portable device, wherein the portable device experiences a first error during the execution of the first command, and wherein the test record includes a first error message;
   uninstalling the application from the portable device;
   reinstalling the application on the portable device;
   providing a second datastream including a second command to the portable device, wherein the first datastream is identical to the second datastream and the second command is identical to the first command; and
   monitoring execution of the second command by the application on the portable device;
   wherein generating the test record includes recording a make and model of the portable device and operating system information;
   updating the test record to include a second error message, wherein the portable device experiences a second error identical to the first error; and
   updating the test record to include an indication of a repeatable error.

2. The method of claim 1 wherein the error is a first error and the error message is a first error message, the method further comprising:
   updating the test record to include a second error message, wherein the portable device experiences a second error, identical to the first error; and
   updating the test record to include an indication of a repeatable error.

3. The method of claim 1 wherein uninstalling the application from the portable device comprises uninstalling the application from the portable device a first time, wherein reinstalling the application on the portable device comprises reinstalling the application on the portable device a first time, wherein the portable device does not experience an error during the execution of the second command, and wherein the method further comprises:
   uninstalling the application from the portable device a second time;
   reinstalling the application on the portable device a second time;
   providing a third command to the portable device, wherein the third command is identical to the first command and the second command; and monitoring execution of the third command by the application on the portable device.

4. The method of claim 1 wherein the portable device is a first portable device, and wherein the first portable device experiences an error during the execution of the second command, the method further comprising:
installing the application on a second portable device, wherein the second portable device is of an identical make and model to the first portable device;
providing a third command to the second portable device, wherein the third command is identical to the first command and the second command; and
monitoring execution of the third command by the application on the second portable device.

5. The method of claim 1, further comprising erasing all previously installed applications on the portable device, prior to installing the application.

6. The method of claim 1, further comprising receiving the application at the application source via a web-interface.

7. A computer-implemented method, comprising: retrieving an application from an application source for error testing;
installing the application on a first portable device, wherein the first portable device includes a first operating system;
providing a first datastream including a first command to the first portable device, wherein the first datastream is randomly generated;
monitoring execution of the first command by the application on the first portable device;
generating a test record associated with the first portable device, wherein the first portable device experiences an error during the execution of the first command, and wherein the test record includes an error message;
installing the application on a second portable device, wherein the second portable device includes a second operating system, different than the first operating system;
providing a second datastream including a second command to the second portable device, wherein the first datastream is identical to the second datastream and the second command is identical to the first command; and
monitoring execution of the second command by the application on the second portable device, wherein the second portable device experiences an error during the execution of the second command; and updating the test record to indicate the error as repeatable.

8. The method of claim 7, further comprising clearing the memory of the second portable device prior to installing the application on the second portable device.

9. A computer-implemented method, comprising:
retrieving an application from an application source, wherein the application was added to the application source for error testing;
installing the application on a first portable device and on a second portable device;
providing a datastream including a command to the first portable device and to the second portable device, wherein providing the datastream includes randomly generating the datastream;
monitoring execution of the command by the application on the first portable device and by the application on the second portable device; and
generating a test record in response to monitoring the execution, wherein the test record includes
a first error message associated with the first portable device and a second error message associated with the second portable device; and
differences between the first error message and the second error message.

10. The method of claim 9, further comprising clearing a memory of the first portable device and clearing a memory of the second portable device.

11. The method of claim 9 wherein generating a test record includes recording operating system information for the first portable device and the second portable device.

12. The method of claim 9 wherein generating a test record includes recording a make and model of the first portable device and a make and model of the second portable device.

13. The method of claim 9, further comprising selecting the first portable device and the second portable device from a plurality of portable devices.

14. The method of claim 9, further comprising:
uninstalling the application from the first portable device and the second portable device;
reinstalling the application on the first portable device and the second portable device;
re-providing the command to the first portable device and to the second portable device; and
monitoring execution of the command by the application on the first portable device and by the application on the second portable device.

* * * * *